United States Patent
Khafagy et al.

(10) Patent No.: US 9,731,722 B2
(45) Date of Patent: Aug. 15, 2017

(54) BRAKE CONTROL FOR STOP/START VEHICLE

(71) Applicant: Ford Global Technologies, LLC, Dearborn, MI (US)

(72) Inventors: Hafiz Shafeek Khafagy, Dearborn, MI (US); Kirk Pebley, Novi, MI (US); Chad Michael Korte, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 14/691,015

(22) Filed: Apr. 20, 2015

(65) Prior Publication Data

US 2016/0304096 A1  Oct. 20, 2016

(51) Int. Cl.
| | | |
|---|---|---|
| *B60W 10/18* | (2012.01) | |
| *B60W 30/18* | (2012.01) | |
| *B60W 10/06* | (2006.01) | |
| *B60W 10/184* | (2012.01) | |

(52) U.S. Cl.
CPC ...... *B60W 30/18109* (2013.01); *B60W 10/06* (2013.01); *B60W 10/184* (2013.01); *B60W 2540/12* (2013.01); *B60W 2540/16* (2013.01)

(58) Field of Classification Search
CPC ........... B60W 30/18109; B60W 10/06; B60W 10/184; B60W 2540/12; B60W 2540/16
See application file for complete search history.

(56) References Cited

U.S. PATENT DOCUMENTS

| | | | |
|---|---|---|---|
| 4,696,222 A | 9/1987 | Han | |
| 5,653,659 A | 8/1997 | Kunibe et al. | |
| 6,059,064 A * | 5/2000 | Nagano | B60K 6/44 180/243 |
| 6,135,920 A | 10/2000 | Kamiya et al. | |
| 8,162,801 B2 | 4/2012 | Liu et al. | |
| 8,348,808 B2 | 1/2013 | Bollig et al. | |
| 8,998,774 B2 | 4/2015 | Yu et al. | |
| 9,381,922 B2 * | 7/2016 | Wysietzki | B60W 40/10 |
| 2007/0192002 A1 * | 8/2007 | Iyoda | B60G 17/0164 701/37 |
| 2007/0225117 A1 * | 9/2007 | Shimizu | B60T 7/12 477/182 |
| 2010/0048352 A1 * | 2/2010 | Yamamoto | B60T 7/085 477/92 |
| 2015/0321675 A1 * | 11/2015 | Park | B60W 10/08 701/53 |
| 2016/0023660 A1 * | 1/2016 | Yu | B60T 7/122 477/188 |
| 2016/0298415 A1 * | 10/2016 | Takahashi | E21B 33/1208 |

* cited by examiner

*Primary Examiner* — David J Hlavka

(74) *Attorney, Agent, or Firm* — David B. Kelley; Brooks Kushman P.C.

(57) ABSTRACT

A vehicle includes an engine having auto-stop and auto-start conditions. The vehicle additionally includes a braking system having an auto-hold function. The auto-hold function is configured to, after braking the vehicle to a full stop, automatically apply braking torque independent of a brake pedal position. The vehicle further includes a controller configured to, in response to the engine being in the auto-stop condition, the auto-hold function automatically applying braking torque, and a gear shifter being moved out of a gear other than PARK, maintain the engine in the auto-stop condition.

3 Claims, 4 Drawing Sheets

BRAKE CONTROL FOR STOP/START VEHICLE

TECHNICAL FIELD

One or more embodiments relate to a vehicle system and method for controlling brake systems and engine shutdown and restart during a drive cycle.

BACKGROUND

There are many instances when a vehicle stops before its destination is reached during a typical driving event. This may occur, for example, when the vehicle stops at traffic signals, cross-walks, stop signs and the like. A stop-start vehicle may enable a stop/start strategy for starting and stopping the vehicle engine during a drive cycle. The engine is shutdown if no power is required (e.g. while waiting at a traffic light). As soon as power is requested, the engine is automatically restarted. The engine may also be automatically started in response to other conditions such as a decrease in battery state of charge or a gear lever being shifted from one gear to another. By avoiding unnecessary engine idling, the vehicle's fuel economy will be improved. For this reason, it is desirable to use the engine shutdown function as much as possible when engine stop conditions are satisfied.

Conventional vehicles typically include a primary brake system and a secondary brake system. The primary brake system is a hydraulic system whereby depression of a brake pedal increases hydraulic pressure within the system which applies one or more brake pads against a rotating member (e.g., a rotor) of each wheel to effect friction braking. The secondary brake system, or parking brake system, is a mechanical system whereby actuation of a lever translates a cable which applies one or more brake pads against a rotating member of each rear wheel.

An electric or electronic parking brake (EPB) system replaces one or more components of the parking brake system with an actuator. There are generally two different types of EPB systems: "cable puller" EPB systems and wheel mount EPB systems. A cable puller EPB system replaces the parking brake lever with an actuator. The actuator is controlled by a switch within the passenger compartment to translate or "pull" the mechanical cables and apply the brake pads. Wheel mount EPB systems include an actuator that is integrated into a wheel mounted brake caliper. Such systems replace the parking brake lever and the mechanical cables.

SUMMARY

A vehicle according to the present disclosure includes an engine having auto-stop and auto-start conditions. The vehicle additionally includes a braking system having an auto-hold function. The auto-hold function is configured to, after braking the vehicle to a full stop, automatically apply braking torque independent of a brake pedal position. The vehicle further includes a controller configured to, in response to the engine being in the auto-stop condition, the auto-hold function automatically applying braking torque, and a gear shifter being moved out of a gear other than PARK, maintain the engine in the auto-stop condition.

In some embodiments, the controller is further configured to control the engine to auto-start in response to the engine being auto-stopped, the auto-hold function automatically applying braking torque, and the gear shifter being moved out of PARK. The engine auto-start may be initiated before the gear shifter reaches a final position.

A method of controlling a vehicle with a braking system, a gear shifter, and an engine with auto-stop and auto-start conditions, includes auto-starting the engine in response to the engine being in the auto-stop condition and the gear shifter being shifted. The method further includes maintaining the engine in the auto-stop condition in response to the engine being auto-stopped, the braking system automatically applying braking torque according to an auto-hold function, and the gear shifter being shifted.

In some embodiments, the maintaining the engine in the auto-stop condition is in response to the gear shifter being shifted out of a gear other than PARK. In such embodiments, the engine may be controlled to auto-start in response to the engine being auto-stopped, the braking system automatically applying braking torque according to an auto-hold function, and the gear shifter being shifted from PARK to a gear other than PARK. The engine auto-start may be initiated before the gear shifter reaches a final position.

A vehicle according to the present disclosure includes an internal combustion engine, a gear shifter, a braking system having an auto-hold function, and a controller. The controller is configured to automatically stop the engine in response to a first condition during a drive cycle and automatically start the engine in response to a second condition during the drive cycle. The controller is further configured to maintain the engine in a stopped condition in response to the second condition with the braking system providing auto-hold functionality.

In some embodiments, the second condition includes a shifter being moved from an initial gear to a subsequent gear. In such embodiments, the initial gear may be a gear other than PARK. The controller may be further configured to automatically start the engine in response to the shifter being moved from PARK to a gear other than PARK with the braking system providing auto-hold functionality. The controller may be further configured to command the engine to auto-start before the shifter is moved into the gear other than PARK.

Embodiments according to the present disclosure provide a number of advantages. For example, embodiments according to the present disclosure may avoid unnecessary engine restarts due to shifting into PARK while the braking auto-hold function is active. Avoiding unnecessary engine restarts may provide various benefits including improving fuel economy, reducing wear and tear on vehicle components, and improving driver satisfaction.

The above advantage and other advantages and features of the present disclosure will be apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
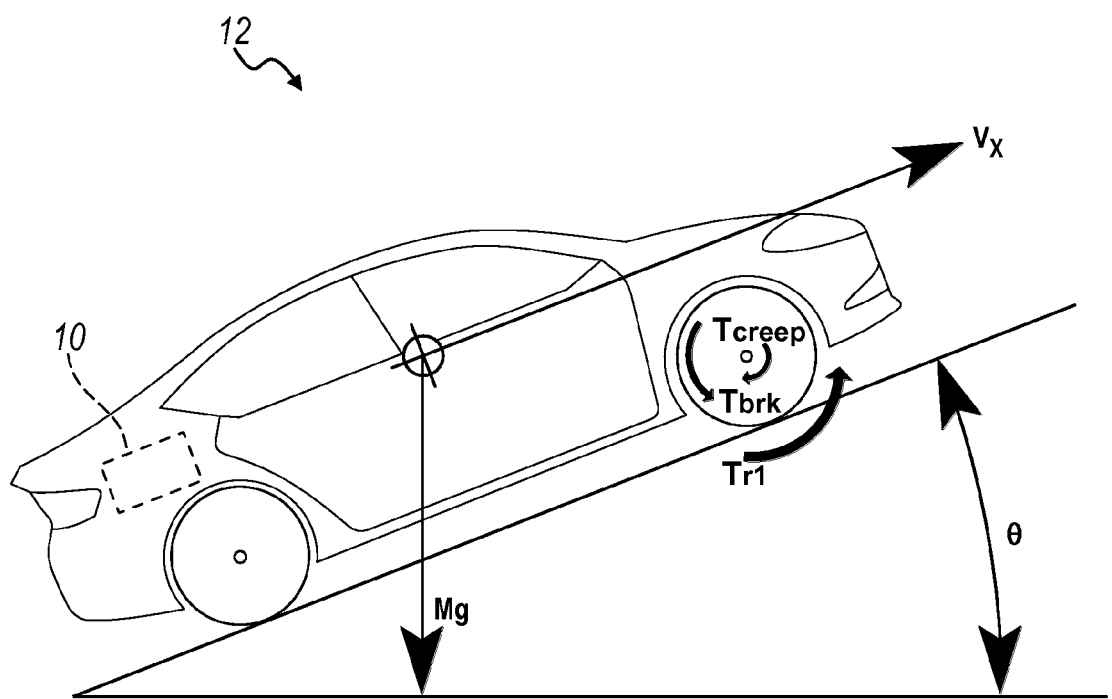
FIG. 1 is a side view of a vehicle illustrated on a road inclined at a gradient.

With reference to FIG. 1, a vehicle system for controlling brake systems during engine shutdown and restart is illustrated in accordance with one or more embodiments and is generally referenced by numeral 10. The vehicle system 10 is depicted within a vehicle 12. In the illustrative example depicted in FIG. 1, the vehicle 12 is stopped upon an inclined surface and illustrated with a number of forces and moments acting thereon. The surface has a gradient θ, which may also be referred to as a road gradient. The resultant torque at the wheels of the vehicle, $T_{veh}$, may be calculated using equation 1 as shown below:

$$T_{veh} = T_{creep} + T_{brk} - T_{rl} = 0 \quad (1)$$

Where $T_{creep}$ represents the output torque provided by the engine at idle speed, $T_{brk}$ is the total brake torque provided by the vehicle brake system(s), and $T_{rl}$ is the torque acting on the vehicle due to "road load" or external forces. $T_{creep}$ is depicted as a positive or clockwise moment, and $T_{rl}$ and $T_{brk}$ are depicted as negative or counter-clockwise moments. $T_{brk}$ acts against the rotation of the wheels and would therefore act as a clockwise moment about the wheels when the vehicle is propelled in a rearward direction by $T_{rl}$, and $T_{brk}$ would act as a counter-clockwise moment about the wheels when the vehicle is propelled in a forward direction by the engine 16. Although each moment is illustrated about a front axle of the vehicle 12, $T_{rl}$ and $T_{brk}$ may both act about both the front and rear axles. In a front-wheel drive vehicle, as depicted in FIG. 1 and shown in further detail in FIG. 2, $T_{creep}$ only acts about the front axle because the engine is not mechanically connected to the rear axle. Because the vehicle 12 is at standstill, $T_{veh}$ is equal to zero and the primary road load is due to gravity. Equation 2 represents an equation for calculating the road load torque $(T_{rl})$:

$$T_{rl} = Mg \, \text{Sin}(\theta) * R_w \quad (2)$$

Where M is the mass of the vehicle; g is the acceleration due to gravity; θ is road gradient; and $R_w$ is the radius of the drive wheels.

Figure 2:
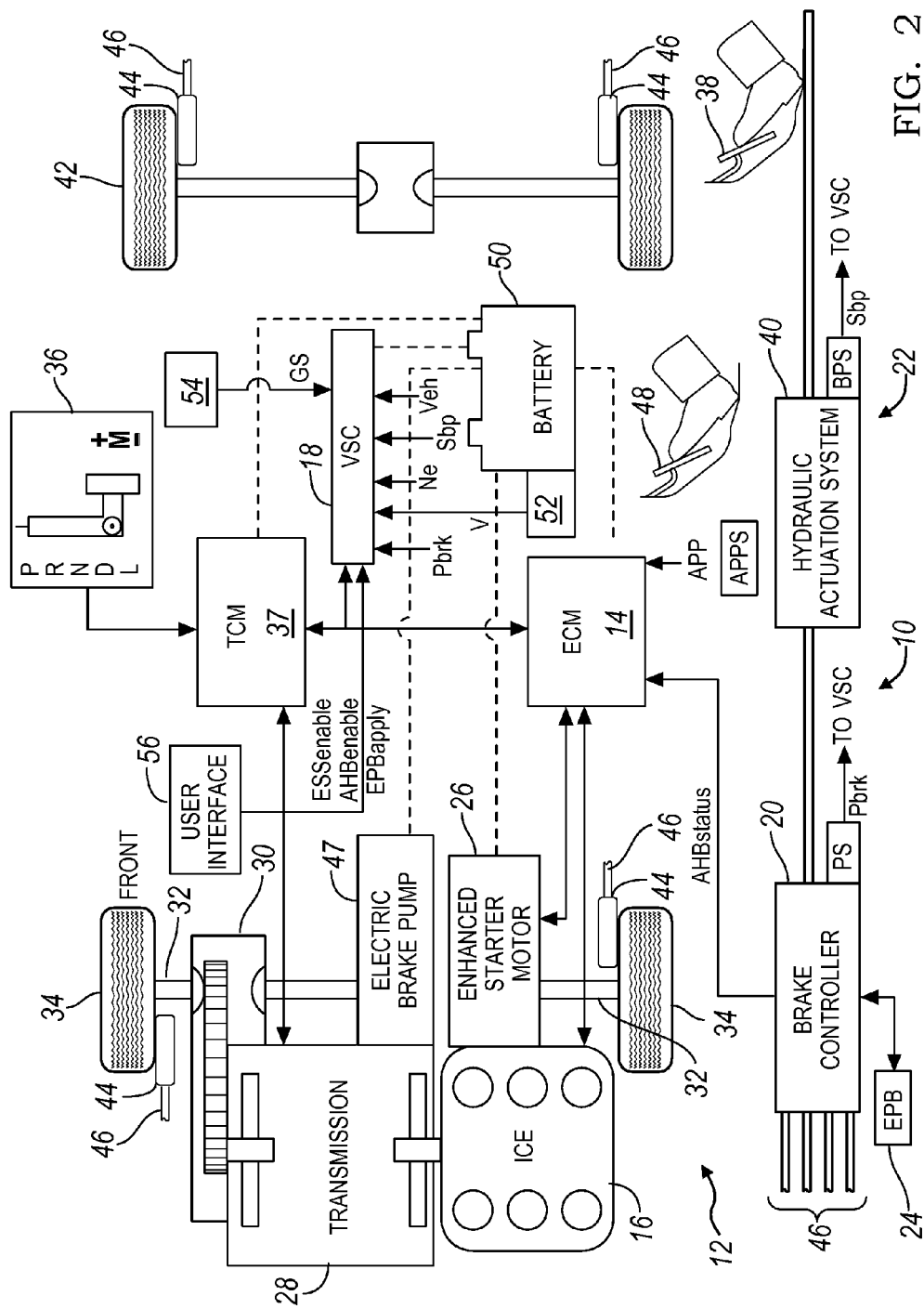
FIG. 2 is a schematic diagram of a vehicle system for controlling brake systems during engine shutdown and restart according to one or more embodiments.

Referring to FIG. 2, the vehicle includes an engine control module (ECM) 14 for controlling an internal combustion engine (ICE) 16. The vehicle 12 is a stop-start vehicle according to one or more embodiments, and includes an engine 16 that may be controlled by the ECM 14 to repeatedly start and stop during a drive cycle to reduce fuel consumption. The vehicle 12 also includes a vehicle system controller (VSC) 18 that is in communication with the ECM 14 and the vehicle system 10. The vehicle system 10 includes a brake controller 20 that communicates with the ECM 14 and the VSC 18. The vehicle system also includes a primary brake system 22 and a secondary brake system 24.

Referring back to FIG. 1 and equation 1, the vehicle torque $(T_{veh})$ must be equal to zero to maintain the vehicle 12 at standstill on an inclined surface. However, if the ECM 14 shuts down the engine 16, then the creep torque $(T_{creep})$ decreases to zero. To maintain the vehicle 12 at standstill without restarting the engine 16, the vehicle system 10 may increase the brake torque $(T_{brk})$ to compensate for the decrease in $T_{creep}$. The brake controller 20 coordinates the control of the primary brake system 22 and the secondary brake system 24 to increase $T_{brk}$ when the engine 16 is shutdown to maintain the position of the vehicle 12 and to avoid roll-back.

The vehicle 12 includes an enhanced starter motor 26 that is coupled to an engine crankshaft. The starter motor 26 receives electrical power and provides output torque to the crankshaft for starting the engine 16.

The vehicle 12 includes a transmission 28 for adjusting the output torque of the engine 16. Torque from the engine 16 is transferred through the transmission 28 to a differential 30 by a transmission output shaft. Axle half shafts 32 extend from the differential 30 to a pair of drive wheels 34 to provide drive torque for propelling the vehicle 12.

The vehicle 12 includes a shifter 36 for selecting a transmission gear. The shifter 36 includes a sensor (not shown) for providing an output signal that corresponds to a selected transmission gear (e.g., PRNDL). A transmission control module (TCM) 37 communicates with the shifter 36 and the transmission 28 for adjusting the transmission gear ratio based on the shifter selection. Alternatively the shifter 36 may be mechanically connected to the transmission 28 for adjusting the transmission gear ratio.

The brake controller 20 includes a controller that is in electrical communication with the ECM 14 and the VSC 18. The primary brake system 22 includes a hydraulic actuation system 40 that converts the motion of a brake pedal 38 into fluid pressure. The hydraulic actuation system 40 includes a booster and a master cylinder. The brake controller 20 is in fluid communication with the hydraulic actuation system 40.

The vehicle 12 includes the drive wheels 34 and driven wheels 42. Each wheel 34, 42 includes a wheel brake assembly 44, such as a caliper or drum brake assembly. A series of hydraulic lines 46 extend between the brake controller 20 and the wheel brake assemblies 44. The wheel brake assemblies 44 convert the hydraulic pressure into a clamp force that acts upon a rotating member of the wheels to effect friction braking. The brake controller 20 includes antilock braking functionality for pulsating the hydraulic pressure. The brake controller 20 also includes an electric brake pump 47 that may be controlled during auto-hold braking (AHB) to increase the brake pressure within the hydraulic lines 46 when the engine is shutdown.

The primary brake system 22 also includes sensors for providing information that corresponds to current brake characteristics, such as a brake pedal position switch (BPS) for providing a brake pedal state $(S_{bp})$ signal that corresponds to a brake pedal position (e.g., applied or released). In other embodiments, the primary brake system 22 includes a position sensor (not shown) for measuring pedal position. The primary brake system 22 also includes one or more sensors for providing output indicative of a braking effort or brake torque that may be measured or derived. In the illustrated embodiment, the sensors include pressure sensors (PS) for providing a brake pressure $(P_{brk})$ signal that corresponds to an actual brake pressure value within the brake system (e.g., brake line pressure or master cylinder pressure).

The vehicle system 10 includes the secondary brake system 24. The secondary brake system is a wheel mount EPB system 24, according to one or more embodiments. A wheel mount EPB system 24 includes an actuator that is integrated into the rear wheel assemblies 44. In other embodiments, the EPB system 24 includes an actuator (not shown) that is mounted to the vehicle frame (not shown) and configured to translate or pull mechanical cables that are connected to the rear wheel assemblies 44.

The brake controller 20 is configured to provide auto-hold brake (AHB) pressure functionality, whereby the brake controller 20 controls or maintains a desired brake torque when the engine is shut down to prevent the vehicle from rolling when stopped on a hill. The brake controller 20 may control the electric brake pump 47 for adjusting the pressure within the hydraulic system and/or control the EPB system 24 for adjusting wheel torque. In a preferred embodiment, the auto-hold brake pressure functionality is activated in response to a braking event in which the vehicle 12 is braked to a full stop. In one or more embodiments, the brake controller 20 provides a status signal (AHB_status) that is indicative of whether or not the AHB functionality is active.

The vehicle 12 includes an accelerator pedal 48 with a position sensor (APPS) for providing an accelerator pedal position (APP) signal that corresponds to a driver demand for propulsion. The ECM 14 controls the throttle of the engine 16 based on the APP signal. In one or more embodiments, the ECM 14 generates a signal ($T_{accel}$) that is indicative of a driver demanded acceleration torque at the wheels, based on APP.

The vehicle 12 includes an energy storage device, such as a battery 50. The battery 50 supplies electrical energy to the vehicle controllers and devices, e.g., the electric pump 47 and the starter motor 26, as generally indicated by dashed lines in FIG. 1. The vehicle 12 may include a single battery 50, such as a conventional low voltage battery, or multiple batteries, including a high voltage battery. Additionally, the vehicle 12 may include other types of energy storage devices, such as capacitors or fuel cells. The vehicle 12 includes a sensor 52 which provides a signal (V) that is indicative of a present voltage of the battery 50.

The vehicle 12 also includes a gradient sensor 54 which provides a signal (GS) that is indicative of a gradient or slope of the vehicle. In one or more embodiments, the gradient sensor 54 is an accelerometer that provides GS based in part on a gravity force component. In other embodiments, the gradient sensor 54 is an inclinometer. In one embodiment, the vehicle system 10 includes a road grade estimator or algorithm that determines road gradient based on GS. In other embodiments, the vehicle includes a navigation system (not shown) that provides signals that may be used for road gradient estimation.

The vehicle 12 includes a user interface 56 that communicates with the VSC 18, according to one or more embodiments. The user interface 56 may include a touch screen display and/or a series of knobs and dials (not shown). The user may manually control engine and brake system functionality using the user interface 56. The user interface 56 provides input signals (ESS_enable, EPB_apply, AHB_enable) to the VSC 18 that are indicative of a user request to enable/disable engine start/stop functionality, apply the EPB 24, and enable/disable AHB functionality, respectively.

The VSC 18 communicates with other vehicle systems, sensors and controllers for coordinating their function. As shown in the illustrated embodiment, the VSC 18 receives a plurality of input signals (e.g., ESS_enable, AHB_enable, EPB_apply, $P_{brk}$, engine speed ($N_e$), $S_{bp}$, vehicle speed (Veh), shifter status (PRNDL_status), etc.) from various vehicle systems and sensors. Although it is shown as a single controller, the VSC 18 may include multiple controllers that may be used to control multiple vehicle systems according to an overall vehicle control logic, or software. The vehicle controllers, including the VSC 18, ECM 14 and the brake controller 20 generally include any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The vehicle controllers communicate with each other and other vehicle systems over one or more wired or wireless vehicle connections using common bus protocols (e.g., CAN and LIN).

The VSC 18 communicates with the ECM 14 to control the shutdown and restart of the engine 16 based on input signals that correspond to brake apply and release conditions. The vehicle system 10 anticipates a vehicle launch event based on brake release conditions. By shutting down the engine 16, a stop-start may have improved fuel economy as compared to a conventional vehicle.

Engine stop start (ESS) and auto-hold braking (AHB) functionality may operate independently of each other. The driver may enable/disable engine stop/start (ESS) and/or auto-hold braking (AHB) using the user interface 56. The vehicle system 10 preferably coordinates ESS functionality with AHB functionality to maximize vehicle fuel economy and improve driver comfort. The vehicle system 10 also coordinates the control of the electric brake pump 47 and the EPB system 24 to provide the AHB functionality. The vehicle system 10 improves driver comfort by extending the time in which a driver may release the brake pedal during a prolonged vehicle stop on an inclined surface.

Figure 3:
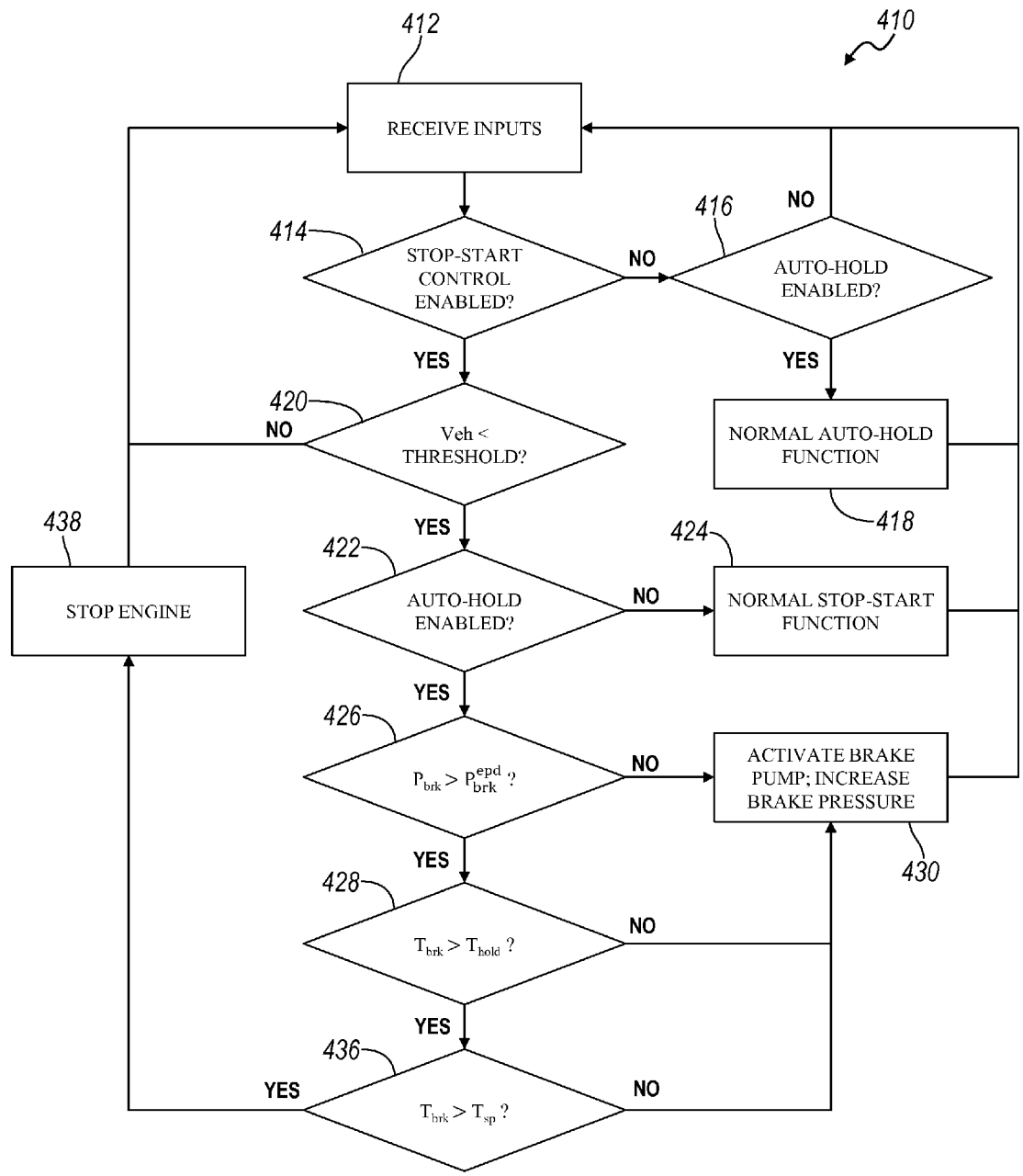
FIG. 3 is a flow chart illustrating a method for controlling brake systems during engine shutdown according to one or more embodiments.

Referring to FIG. 3, a method for controlling brake systems during engine shutdown is illustrated in accordance with one or more embodiments and generally referenced by numeral 410. The method 410 may be implemented using software code contained within the brake controller 20 according to one or more embodiments. In other embodiments the software code is shared between multiple controllers (e.g., the ECM 14, the VSC 18 and the brake controller 20).

At operation 412, the vehicle system 10 receives input signals including ESS_enable, AHB_enable, Veh, and $P_{brk}$. At operation 414 the vehicle system 10 evaluates the ESS_enable signal to determine if engine start/stop functionality is enabled. The user may manually disable ESS functionality using the user interface 56. Additionally, vehicle controllers (e.g., the ECM 14) may disable ESS functionality under certain vehicle conditions. If ESS is not enabled, the vehicle system 10 proceeds to operation 416 to determine if AHB is enabled. At operation 416 the vehicle system 10 evaluates the AHB_enable signal to determine if auto-hold braking functionality is enabled. The user may manually disable AHB functionality using the user interface 56. Additionally, vehicle controllers (e.g., the brake controller 20) may disable AHB functionality under certain vehicle conditions. If AHB functionality is enabled, then the vehicle system 10 proceeds to operation 418 and provides normal AHB functionality independent of ESS functionality. If the determination at operation 414 is positive, (i.e., engine start/stop control is enabled) then the vehicle system 10 proceeds to operation 420.

At operation 420, the vehicle system 10 evaluates the vehicle speed signal (Veh) to determine if Veh is less than a speed threshold. In one embodiment, the speed threshold is approximately five mph. If Veh is less than the speed threshold, the vehicle system 10 proceeds to operation 422 and evaluates the AHB_enable signal to determine if auto-hold braking is enabled. If AHB is not enabled, then the vehicle system 10 proceeds to operation 424 and provides ESS functionality independent of AHB. If the determination at operation 422 is positive then this would indicate that both ESS functionality and AHB functionality are enabled, and the vehicle system 10 proceeds to operation 426 to coordinate their functionality.

At operation 426, the vehicle system 10 evaluates the brake pressure signal ($P_{brk}$) to determine if the brake pressure is greater than an engine pull-down brake pressure threshold ($P_{brk}^{epd}$). $P_{brk}^{epd}$ represents a minimum brake pressure level for holding a vehicle at standstill after the engine is stopped. In one embodiment, $P_{brk}^{epd}$ may be calculated, for example as disclosed in U.S. Pat. No. 8,998,774. The vehicle system 10 may determine torque values based on the brake pressure values including: ($T_{brk}$) which is a torque that corresponds to $P_{brk}$; and ($T_{hold}$) which is a torque value that corresponds to $P_{brk}^{epd}$. At operation 428, the vehicle system 10 evaluates $T_{brk}$ to determine if $T_{brk}$ is greater than $T_{hold}$. If the determination at either of operations 426 and 428 is negative, then the vehicle system 10 proceeds to operation 430 and activates the electric brake pump 47 to increase brake pressure ($P_{brk}$). If the determination at operation 428 is positive, the vehicle system 10 proceeds to operation 436.

At operation 436, the vehicle system 10 compares the total brake torque ($T_{brk}$) to a brake torque setpoint ($T_{sp}$) to determine if $T_{brk}$ is greater than $T_{sp}$. $T_{sp}$ corresponds to the sum of $T_{hold}$ and $T_{creep}$. The engine 16 provides creep torque when operating at idle, however $T_{creep}$ decreases to zero when the engine is shutdown. Thus, the vehicle system 10 increases the brake pressure ($P_{brk}$) to compensate for $T_{creep}$ before turning off the engine, to avoid any rollback of the vehicle. If the determination at operation 436 is negative, the vehicle system returns to operation 430. If the determination at operation 436 is positive, then the vehicle system 10 proceeds to operation 438 and stops the engine 16.

In a variation on the above, if the determination at operation 436 is negative, the vehicle system 10 may provide an indicator to a driver via the user interface 56. The indicator may prompt the driver to increase pressure on the brake pedal to initiate an engine auto-stop. In such an embodiment, pump activation is unnecessary due to driver-supplied brake pressure. In an additional alternative embodiment, if the determination at operation 436 is negative, the vehicle system 10 may take no action. In such an embodiment, the engine may simply continue running.

Figure 4:
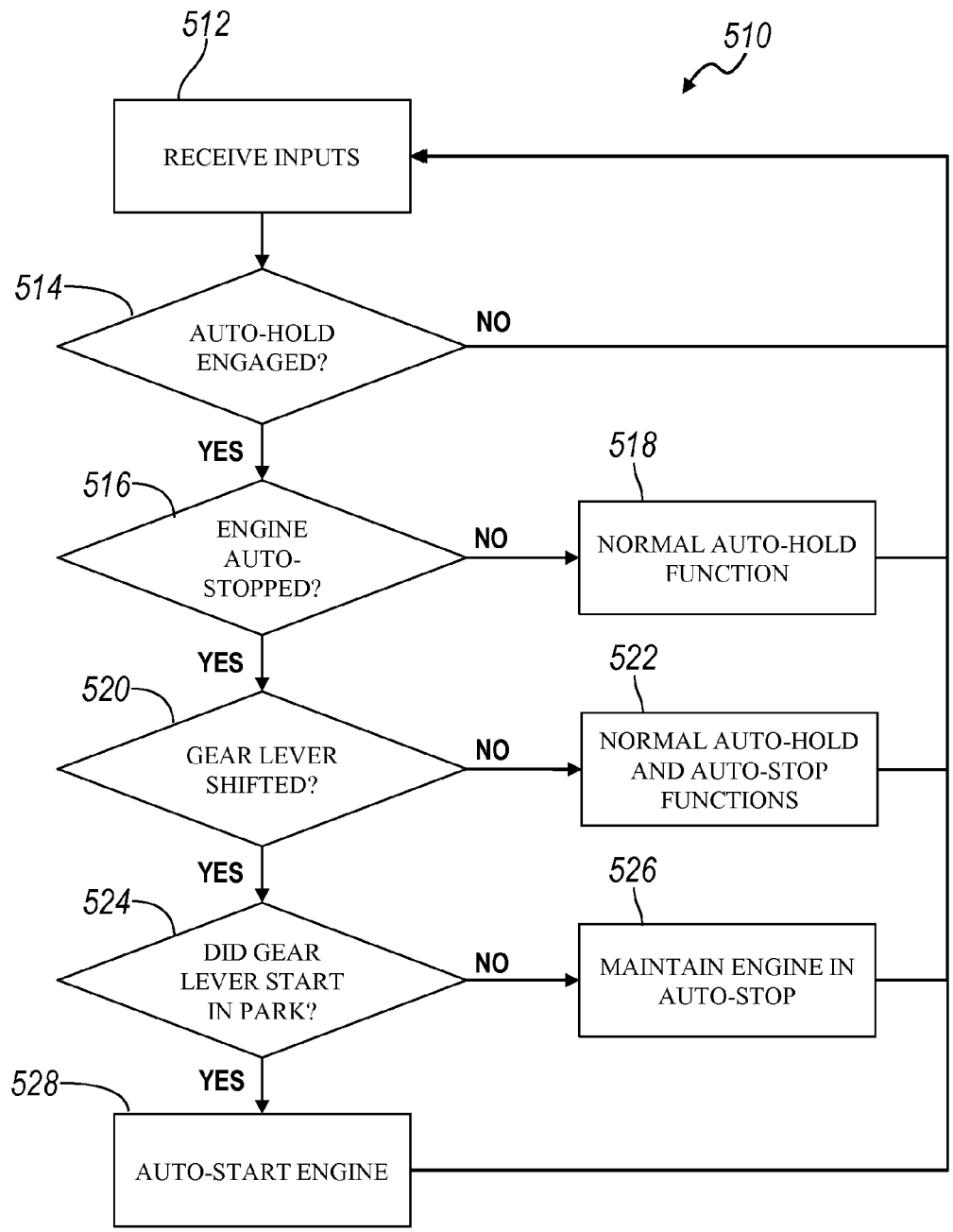
FIG. 4 is a flow chart illustrating a method for coordinating brake systems and engine systems according to one or more embodiments.

When AHB is active and the engine is auto-stopped, the vehicle system 10 evaluates the driver's intent for vehicle propulsion according to various methodologies, as disclosed, for example, in co-pending application Ser. No. 14/339,887, hereby incorporated by reference in its entirety. Referring now to FIG. 4, a method for evaluating vehicle propulsion intent based on movement of a gear shifter is illustrated in accordance with one or more embodiments and generally referenced by numeral 510. The method 510 is implemented using software code contained within the ECM 14 according to one or more embodiments. In other embodiments, the software code is shared between multiple controllers (e.g. the ECM 14, the brake controller 20, and the VSC 18).

At operation 512, the vehicle system 10 receives inputs including an engine speed $N_e$, an auto-hold brake status AHB_status, and a shifter status PRNDL_status. At operation 514, the vehicle system 10 evaluates AHB_status to determine if the AHB function is engaged. If the determination is negative, i.e. the AHB function is not engaged, the vehicle system returns to operation 512. If the determination is positive, the vehicle system 10 proceeds to operation 514.

At operation 514, the vehicle system 10 evaluates $N_e$ to determine whether the engine has been auto-stopped. If the determination is negative, e.g. $N_e$ is a non-zero number indicating that the engine is not stopped, the vehicle system 10 proceeds to operation 518. At operation 518, the vehicle system 10 controls the braking system to provide normal AHB functionality. The vehicle system 10 then returns to operation 512.

If the determination of operation 516 is positive, i.e. the engine is auto-stopped, the vehicle system 10 proceeds to operation 518. At operation 518, the shifter evaluates PRNDL_status to determine whether the shifter 36 is being moved from one gear to another. If the determination is negative, e.g. the shifter 36 is not being moved from one gear to another, the vehicle system 10 proceeds to operation 522. At operation 522, the vehicle system 10 controls the braking system to provide normal AHB functionality and maintains the engine in the auto-stopped condition according to normal stop-start functions. The engine may, however, be auto-started due to other conditions such as a change in battery state of charge, power consumption, or other auto-start requests. The vehicle system 10 then returns to operation 512.

If the determination of operation 520 is positive, i.e. the shifter 36 is being moved from one gear to another, the vehicle system 10 proceeds to operation 524. At operation 524, the vehicle system 10 evaluates PRNDL_status to determine whether the shifter 36 is being shifted out of PARK. In other words, the vehicle system 10 determines whether the shifter 36 was in PARK prior to the current move.

If the determination of operation 524 is negative, i.e. the shifter 36 is being moved out of a non-PARK gear, the vehicle system 10 proceeds to operation 526. When the shifter 36 is being moved out of a non-PARK gear with the vehicle stopped, it may be inferred that a high probability exists that the shifter 36 is being moved into PARK. At operation 526, the vehicle system 10 maintains the engine in the auto-stop condition. This may include inhibiting an engine auto-start request that would normally issue due to the shift. The engine may, however, be auto-started due to other conditions such as a change in battery state of charge, power consumption, or other auto-start requests. The vehicle system 10 then returns to operation 512.

Subsequent the shifter 36 being moved to PARK, the AHB function may remain active and the braking system may continue to provide AHB functionality. In a preferred embodiment, the AHB functionality is maintained until an additional condition is satisfied. In various embodiments, the additional condition may include the application of an EPB, a driver egress from the vehicle being detected (e.g. via detecting a driver door opening and closing or a driver seat occupant sensor detecting the driver egress), an ignition switch being turned off, or a calibratable time interval elapsing.

If the determination of operation 524 is positive, i.e. the shifter 36 is being moved from PARK to another gear, the vehicle system 10 proceeds to operation 528. It may be inferred that if a driver is moving the shifter 36 from PARK to a non-PARK gear, the driver intends to resume travel and will request propulsive power. At operation 528 the vehicle system 10 auto-starts the engine. The vehicle system 10 then returns to operation 512.

Variations on the above are, of course, possible. As an example, embodiments according to the present disclosure may be implemented in any vehicle having an engine configured to automatically stop according to one operating condition and automatically start according to a second operating condition during a drive cycle, including hybrid electric vehicles.

As may be seen, the present disclosure provides a system and method for controlling an engine in a vehicle that may avoid unnecessary engine restarts due to shifting into PARK while the braking auto-hold function is active. Avoiding unnecessary engine restarts may provide various benefits including improving fuel economy, reducing wear and tear on vehicle components, and improving driver satisfaction.

While the best mode has been described in detail, those familiar with the art will recognize various alternative designs and embodiments within the scope of the following claims. Additionally, the features of various implementing embodiments may be combined to form further embodiments of the invention. While various embodiments may have been described as providing advantages or being preferred over other embodiments or prior art implementations with respect to one or more desired characteristics, those of ordinary skill in the art will recognize that one or more features or characteristics may be compromised to achieve desired system attributes, which depend on the specific application and implementation. These attributes may include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications. Additionally, the features of various implementing embodiments may be combined to form further embodiments of the invention.

What is claimed is:

1. A vehicle comprising:
    an engine;
    a braking system having an auto-hold function configured to, after braking the vehicle to a full stop, automatically apply braking torque independent of a brake pedal position; and
    a controller configured to, responsive to an auto-stop condition of the engine being active, the auto-hold function automatically applying braking torque, and a gear shifter being moved out of PARK, control the engine to auto-start.

2. The vehicle of claim 1, wherein the auto-start is controlled before the gear shifter reaches a final position.

3. The vehicle of claim 1, wherein the controller is further configured to maintain the auto-stop condition when a brake pedal is released.

* * * * *